US010214192B2

(12) United States Patent
Lechler et al.

(10) Patent No.: US 10,214,192 B2
(45) Date of Patent: Feb. 26, 2019

(54) SOLENOID VALVE FOR A VEHICLE BRAKING SYSTEM

(71) Applicant: Robert Bosch GmbH, Stuttgart (DE)

(72) Inventors: Andreas Lechler, Moeglingen (DE); Jens Norberg, Stuttgart (DE); Martin Haas, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/504,282

(22) PCT Filed: Aug. 4, 2015

(86) PCT No.: PCT/EP2015/067945
§ 371 (c)(1),
(2) Date: Feb. 15, 2017

(87) PCT Pub. No.: WO2016/045850
PCT Pub. Date: Mar. 31, 2016

(65) Prior Publication Data
US 2017/0232946 A1  Aug. 17, 2017

(30) Foreign Application Priority Data
Sep. 23, 2014 (DE) .................. 10 2014 219 183

(51) Int. Cl.
*F16K 31/06* (2006.01)
*B60T 8/36* (2006.01)
(Continued)

(52) U.S. Cl.
CPC ............ *B60T 8/363* (2013.01); *B60T 8/36* (2013.01); *F16K 31/0675* (2013.01);
(Continued)

(58) Field of Classification Search
CPC ...... F16K 49/002; F16K 31/0675; H01F 7/10; H01F 7/121; H01F 7/064; B60T 8/33; B60T 8/363
See application file for complete search history.

(56) References Cited

U.S. PATENT DOCUMENTS 5,201,341 A * 4/1993 Saito .................. F02D 7/02
123/557
6,042,707 A * 3/2000 Moslehi .................. C23C 14/22
118/723 FE
(Continued)

FOREIGN PATENT DOCUMENTS

CN          1760575 A    4/2006
DE  10 2012 215 257 A1  3/2014
(Continued)

OTHER PUBLICATIONS

International Search Report corresponding to PCT Application No. PCT/EP2015/067945, dated Nov. 10, 2015 (German and English language document) (5 pages).

*Primary Examiner* — Ian Paquette
(74) *Attorney, Agent, or Firm* — Maginot, Moore & Beck LLP

(57) ABSTRACT

In one embodiment, a solenoid valve for a vehicle braking system includes a magnet assembly having a winding support, a coil winding, a housing, and a cover disc. The solenoid value further includes a valve cartridge having a capsule, a valve insert, a valve seat, and an armature. The valve insert can be connected to the capsule, the armature can be guided within the capsule in an axially movable manner and has a closing element. The closing element and the valve seat can form a valve that can control a fluid flow through the valve cartridge. The coil winding can be wound on the winding support to form an electrical coil, which can be controlled using control signals applied to electrical
(Continued)

connectors. The electric coil generates a magnetic force that can move the armature against a force of a return spring.

10 Claims, 2 Drawing Sheets

(51) Int. Cl.
*F16K 49/00* (2006.01)
*H01F 7/06* (2006.01)
*H01F 7/10* (2006.01)
*H01F 7/121* (2006.01)

(52) U.S. Cl.
CPC ........... *F16K 49/002* (2013.01); *H01F 7/064* (2013.01); *H01F 7/10* (2013.01); *H01F 7/121* (2013.01)

(56) References Cited

U.S. PATENT DOCUMENTS

| | | |
|---|---|---|
| 6,187,459 B1 | 2/2001 | Katayama et al. |
| 8,123,193 B2 * | 2/2012 | Kratzer .................. B60T 8/363 137/15.17 |

FOREIGN PATENT DOCUMENTS

| | | |
|---|---|---|
| JP | 59-37384 A | 2/1984 |
| JP | 5-39883 A | 2/1993 |
| JP | 2005-188605 A | 7/2005 |
| JP | 2008-144761 A | 6/2008 |
| JP | 2010-510446 A | 4/2010 |
| JP | 2014-55572 A | 3/2014 |

* cited by examiner

SOLENOID VALVE FOR A VEHICLE BRAKING SYSTEM

This application is a 35 U.S.C. § 371 National Stage Application of PCT/EP2015/067945, filed on Aug. 4, 2015, which claims the benefit of priority to Serial No. DE 10 2014 219 183.1, filed on Sep. 23, 2014 in Germany, the disclosures of which are incorporated herein by reference in their entirety.

The disclosure relates to a solenoid valve for a vehicle braking system according to the preamble of the independent claim 1.

In known vehicle braking systems having ABS/ESP functionality (ABS: anti-lock braking system, ESP: electronic stability program), so-called inlet valves are used that are embodied as solenoid valves and during control procedures, such as by way of example an ABS braking procedure, said inlet valves control the build-up of pressure in a wheel brake caliper. These solenoid valves comprise in each case a magnet assembly having a winding support, a coil winding, a housing and a cover disc and a valve cartridge that comprises a capsule, a valve insert that is connected to said capsule, an armature that is guided within the capsule in an axially movable manner between a closed position and an open position, said armature comprising a closing element, and said valve cartridge comprises a valve insert that is connected to the capsule and comprises a valve seat, wherein the closing element and the valve seat form a valve in order to control a fluid flow through the valve cartridge. The coil winding that is part of the magnet assembly and is wound on the winding support forms an electrical coil that can be controlled by way of control signals that are applied to electrical connectors and said electrical coil generates a magnetic force that moves the armature against the force of a return spring, wherein in a heating operation it is possible, based on the control signals, to change the fluid temperature within the valve cartridge. In the case of a fully energized inlet valve, the hydraulic connection between the master brake cylinder and the wheel brake caliper is interrupted. The current urges the closing element of the inlet valve into the corresponding valve seat so that fluid can no longer flow through the inlet valve. Such an inlet valve is a controllable or adjustable valve, in other words in addition to assuming the states "fully open" (open position) and "fully closed" (closed position), it can also assume intermediate positions. Nevertheless, in the case of specific ABS maneuvers, the option is used of operating the inlet valve in a QS operation (=quasi switching operation), in which the inlet valve is switched as quickly as possible from the closed position into the open position in order to convey pressure as quickly as possible into the wheel brake caliper. The solenoid valve is repeatedly opened and closed for a few milliseconds. Consequently, the pressure is built up in steps in the wheel brake caliper. This stepped build-up of pressure is however dependent upon the temperature. The reason for this is above all the temperature-dependent viscosity of the brake fluid. Particularly in the case of temperatures below 0° C., the viscosity increases exponentially with a reducing temperature. This means for the inlet valve that the solenoid armature of the inlet valve is no longer able to move as quickly through the fluid that has a higher viscosity, so that it takes longer until the inlet valve is fully open. Consequently, the pressure steps produced during lower temperatures are smaller. In order to counteract this effect, there does exist nowadays the so-called "preheating functionality". In so doing, the valve is energized if the vehicle sets off in the case of low outside temperatures, wherein the inlet valve is closed as a side effect. The continuous energization causes the solenoid coil to heat up and transfer the heat via the path: coil-winding support-air gap-capsule-fluid-armature grooves. If the heat reaches the fluid at the solenoid armature, the viscosity of the fluid reduces at that site and the solenoid armature can move more quickly through the fluid. In the case of the known preheating functionality, the heat path from the site where the heat is produced in the coil winding, as far as the site of the desired heat transfer into the valve cartridge is quite long and is interrupted by means of the winding support that is generally produced as a synthetic material component that has a low thermal conductivity value. In addition, the thermal heat is produced exclusively by means of the ohmic losses in the coil winding.

SUMMARY

The solenoid valve in accordance with the disclosure for a vehicle braking system and having the features of the independent claim 1, has in contrast the advantage that in the case of embodiments of the present disclosure, the thermal output is produced to a considerable extent by means of electrical induction and associated eddy currents directly in the iron circuit of the solenoid valve, and not, as is the case in the prior art, exclusively by means of the ohmic losses in the coil winding. In particular, the in the surface of the solenoid armature and the eddy currents that are induced in the non-magnetic capsule heat directly the fluid that is surrounding the solenoid armature. An essential aspect of the present disclosure is the fact that the magnet assembly is electrically controlled differently from the standard procedure of controlling the solenoid valve and consequently also from the hitherto ohmic heating procedure. In lieu of the hitherto unipolar control procedure using pulse width modulation at a high clock frequency, mostly in the range of 4 kHz to 10 kHz, a bipolar pulsating procedure that has a considerably lower frequency is now used. Whereas in the case of the conventional preheating functionality the complete thermal output is produced in the coil, in the case of the embodiments of the present disclosure only a smaller portion of the entire thermal output is produced in the coil, whereas a multiple of the coil losses is now produced in an inductive manner directly in the iron circuit of the solenoid valve.

While a current that comprises a large DC component is produced during the ohmic heating procedure using a unipolar pulsating procedure, in so doing a considerable magnetic force that is undesired for the application of the heating procedure is produced in addition to the ohmic losses in the coil. In contrast thereto, the control procedure using a bipolar pulsating procedure produces a current that comprises relatively large AC components. The DC component of the current completely disappears in the case of the control procedure of this type. The AC components of the current lead to considerable magnetic AC fields that cause eddy currents in the iron circuit of the solenoid valve and as a result the flux-carrying iron parts become warm. Depending upon the constructive design of the magnetic circuit and of the solenoid valve, the frequency of the bipolar control procedure is on the one hand selected to be of such a small value that the greatest possible eddy current losses occur in the iron circuit and especially in the solenoid armature. Insofar as the switching of the solenoid valve is to be avoided, the frequency of the bipolar control procedure is on the other hand selected to be of such a large value that the magnetic force does not exceed a threshold value that is dependent upon the valve design, in particular upon the resilient force of the return spring, so that a mechanical reaction of the solenoid valve does not occur. The control frequency for the inductive heating procedure in accordance with the present disclosure can lie in the range of 0.1 kHz to 2.0 kHz when using currently conventional solenoid valves.

One variant of the above described heating operation resides in the fact that a mechanical reaction of the solenoid valve, in other words a switching of the solenoid valve, is accepted. In this case, the frequency of the bipolar control procedure can be selected solely with respect to the maximal inductive thermal output. In a further type of heating operation, the two above described types of heating operations can be combined in such a manner that, in dependence upon a prevailing operating state of the vehicle, a switching procedure is performed between the two above described types of heating operations "without a mechanical reaction of the valve" or "with a mechanical reaction of the valve" and thus the respective advantages can be combined. It is thus possible, by way of example during a time period in which the parking brake is activated or during an operating state where the engine noises are increased, to select the type of operation "with a mechanical reaction of the valve", and in operating states in which a mechanical reaction of the valve is not desired, it is possible by selecting a higher frequency of the bipolar control procedure, to switch into the type of heating operating "without a mechanical reaction of the valve".

Embodiments of the present disclosure provide a solenoid valve for a vehicle braking system, said solenoid valve having a magnet assembly that comprises a winding support, a coil winding, a housing and a cover disc and said solenoid valve having a valve cartridge that comprises a capsule, a valve insert that is connected to said capsule, an armature that is guided within the capsule in an axially movable manner between a closed position and an open position, said armature comprising a closing element, and said valve cartridge comprises a valve insert that is connected to the capsule and comprises a valve seat. The closing element and the valve seat form a valve which controls a fluid flow through the valve cartridge. In so doing, the coil winding that is part of the magnet assembly and is wound on the winding support forms an electrical coil that can be controlled by way of control signals that are applied to electrical connectors and said electrical coil generates a magnetic force that moves the armature against the force of a return spring. In a heating operation, it is possible based on the control signals to change the fluid temperature within the valve cartridge. In accordance with the disclosure, the control signals are applied to the coil winding as bipolar AC signals having a predetermined frequency and generate eddy currents in the iron circuit of the solenoid valve and in the capsule, and said eddy currents heat up the fluid that is present in the valve cartridge.

Advantageous improvements of the solenoid valve that is disclosed in the independent claim 1 are rendered possible for the vehicle braking system by virtue of the features and further developments that are disclosed in the dependent claims.

In an advantageous embodiment of the solenoid valve in accordance with the disclosure, the iron circuit of the solenoid valve comprises the armature, the housing and the cover disc.

It is particularly advantageous that the coil winding can be arranged in the bridge branch of an H-bridge circuit that comprises four switching transistors. The electronic H-bridge circuit is also described as a four quadrant chopper circuit, and comprises, as is known, four switching transistors that are embodied by way of example, and in each case are field effect transistors (FET) that comprise an integrated free-wheeling diode in reverse polarity.

In a further advantageous embodiment of the solenoid valve in accordance with the disclosure, the operation of heating the magnet assembly can include at least two heating modes that comprise in each case a predetermined frequency range for the bipolar AC signals. In a first heating mode, the frequency of the bipolar AC signal can be predetermined from a first frequency range so that the valve does not react to the applied control signals. It is preferred that the first frequency range includes frequencies in the range of ca. 0.1 kHz to 2.0 kHz. In a second heating mode, the frequency of the bipolar AC signal can be predetermined from a second frequency range so that a maximal inductive thermal output can be achieved. It is preferred that the second frequency range includes frequencies in the range of ca. 2.1 kHz to 3.0 kHz.

In a further advantageous embodiment of the solenoid valve in accordance with the disclosure, it is possible in a third heating mode in dependence upon the operating state of the vehicle to switch between the first heating mode and the second heating mode, wherein the prevailing frequency of the bipolar AC signal is dependent upon the available onboard network voltage. It is thus possible, by way of example, to store the optimal frequency for each voltage position in the form of a characteristic curve. The characteristic curve can be stored by way of example in the control unit of the vehicle braking system.

One exemplary embodiment of the disclosure is illustrated in the drawings and is further explained in the description hereinunder. In the drawings, like reference numerals describe components or elements that perform like or similar functions.

DETAILED DESCRIPTION

Figure 1:
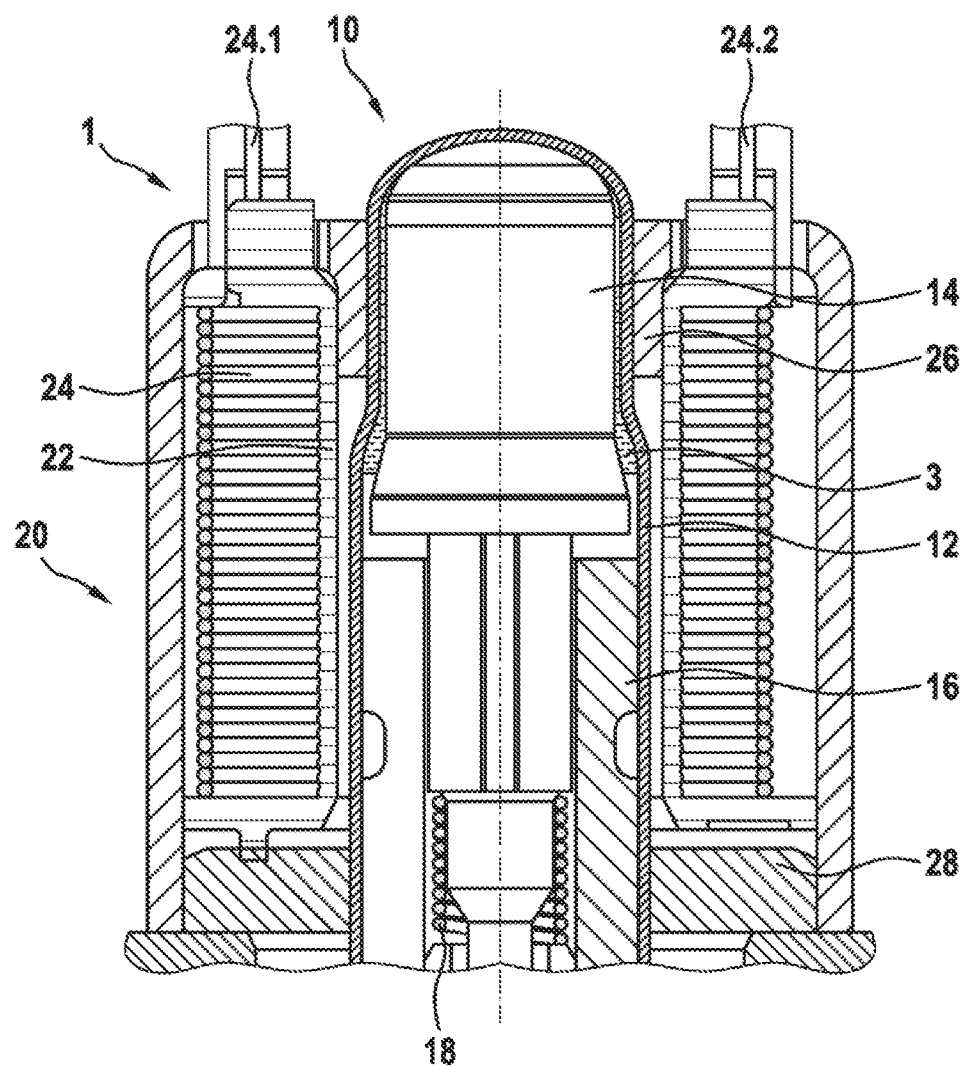
FIG. 1 illustrates a schematic sectional view of a detail of an exemplary embodiment of a solenoid valve in accordance with the disclosure for a vehicle braking system.

As is evident in FIG. 1, the illustrated exemplary embodiment of a solenoid valve 1 in accordance with the disclosure for a vehicle braking system comprises a valve cartridge 10 and a magnet assembly 20. The valve cartridge 10 comprises a capsule 12, a valve insert 16 that is connected to the capsule 12, an armature 14 that is guided within the capsule 12 in an axially movable manner between a closed position and an open position, said armature comprising a closing element (not further illustrated), and said valve cartridge comprises a valve insert 16 that is connected to the capsule 12 and comprises a valve seat (not further illustrated). The closing element and the valve seat form a valve that controls a fluid flow through the valve cartridge 10. The magnet assembly 20 comprises a winding support 22, a coil winding 24 that is wound on the winding support 22, a housing 26 and a cover disc 28 that closes the housing 26 towards the bottom. The magnet assembly 20 is pushed with the housing 26 and the cover disc 28 onto the upper part of the capsule 12 of the valve cartridge 10. The coil winding 24 that is part of the magnet assembly 20 and is wound on the winding support 22 forms an electrical coil that can be controlled by way of control signals that are applied to electrical connectors 24.1, 24.2 and said electrical coil generates a magnetic force that moves the armature 14 against the force of the return spring 18. In a heating operation, it is possible based on the control signals to change the fluid temperature within the valve cartridge 10, preferably to increase said temperature. In accordance with the disclosure, the control signals are applied to the coil winding 24 as bipolar AC signals having a predetermined frequency, and generate eddy currents in the iron circuit of the solenoid valve 1 and in the capsule 12, and said eddy currents heat up the fluid 3 that is present in the valve cartridge 10.

Embodiments of the solenoid valve in accordance with the disclosure can be used by way of example in an anti-lock braking system (ABS) or a traction control system (ASR system) or an electronic stability program system (ESP system). In the illustrated exemplary embodiment, the solenoid valve 1 in accordance with the disclosure is embodied by way of example as a non-energized open control valve that can be operated in the case of specific requirements in a QS operation (=quasi switching operation) in which it is possible to switch as quickly as possible from the closed position into the open position. Alternatively, the solenoid valve 1 in accordance with the disclosure can be embodied as a non-energized closed control valve that can be operated in the case of specific requirements in a QS operation (=quasi switching operation) in which it is possible to switch as quickly as possible from the closed position into the open position. Furthermore, embodiments of the solenoid valve 1 in accordance with the disclosure for a vehicle braking system can be sealed in a corresponding receiving bore of a fluid block (not illustrated).

Figure 2:
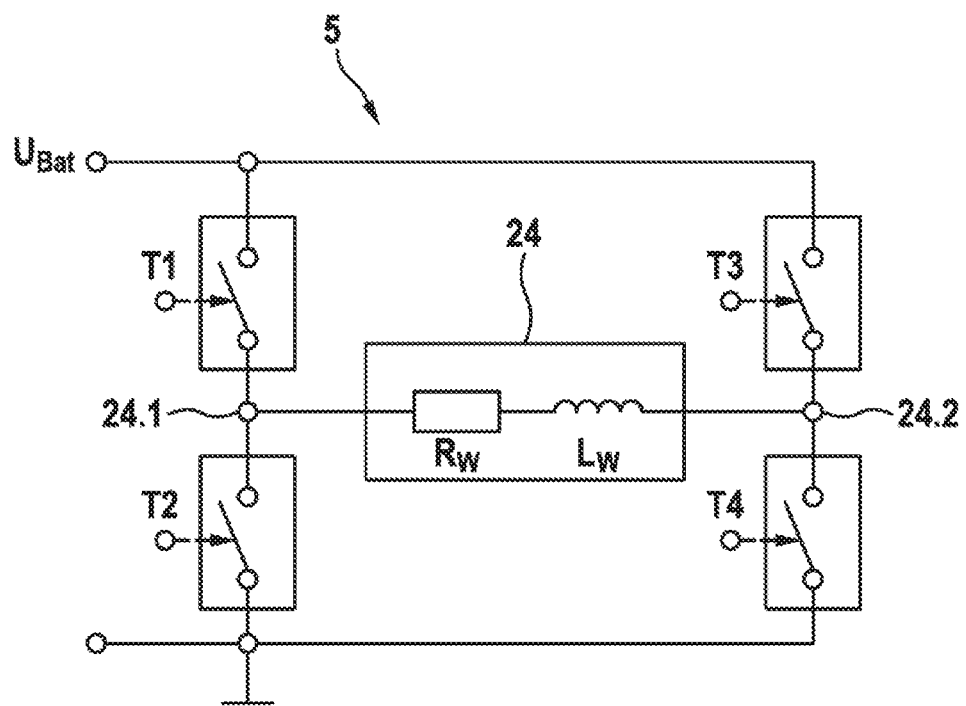
FIG. 2 illustrates a schematic switching diagram of an electronic H-bridge circuit for controlling the solenoid valve in accordance with the disclosure for a vehicle braking system shown in FIG. 1.

As is evident in FIG. 2, the coil winding 24 is arranged in the bridge branch of an H-bridge circuit 5 that comprises four switching transistors T1, T2, T3, T4. FIG. 2 illustrates the equivalent circuit diagram of the coil winding 24 having an inductivity $L_W$ and an ohmic resistance $R_W$.

As is further evident in FIG. 1, the iron circuit of the solenoid valve 1 comprises the armature 14, the housing 26 and the cover disc 28 of the magnet assembly 20. In the illustrated exemplary embodiment, the heating operation of the magnet assembly 10 includes three different heating modes that comprise in each case a predetermined frequency range for the bipolar AC signals. In a first heating mode, the frequency of the bipolar AC signals is predetermined from a first frequency range so that the valve does not react to the applied control signals. The first frequency range includes by way of example frequencies in the range of ca. 0.1 kHz to 2.0 kHz.

In a second heating mode, the frequency of the bipolar AC signals is predetermined from a second frequency range so that a maximal inductive thermal output can be achieved. The second frequency range includes by way of example frequencies in the range of ca. 2.1 kHz to 3.0 kHz. In a third heating mode, the heating mode is switched between the first heating mode and the second heating mode in dependence upon the operating state of the vehicle, wherein the prevailing frequency of the bipolar AC signal is dependent upon the available onboard network voltage. It is preferred that the optimal frequency for each voltage position is stored in the form of a characteristic curve in the control unit of the vehicle braking system.

Embodiments of the present disclosure provide a solenoid valve for a vehicle braking system, wherein the thermal output of said solenoid valve is to a considerable extent generated by means of electrical induction and the associated eddy currents directly in the iron circuit of the solenoid valve, and not, as is the case in the prior art, exclusively by ohmic losses in the coil winding.

The invention claimed is:

1. A solenoid valve for a vehicle braking system, comprising:
    a magnet assembly including:
        a winding support;
        a coil winding;
        a housing; and
        a cover disc;
    a valve cartridge including:
        a capsule;
        a valve insert connected to the capsule;
        a valve seat; and
        an armature configured to be guided within the capsule in an axially movable manner between a closed position and an open position, the armature including a closing element,
    wherein the closing element and the valve seat are configured to form a valve that is operable to control a fluid flow through the valve cartridge,
    wherein the coil winding is wound on the winding support to form an electrical coil, the electrical coil being configured to be controlled by using control signals applied to electrical connectors,
    wherein the electric coil is further configured to generate a magnetic force that is operable to move the armature against a force of a return spring,
    wherein fluid temperature within the valve cartridge is changeable based on the control signals,
    wherein the control signals are configured to be applied to the coil winding as bipolar AC signals having a predetermined frequency and are further configured to generate eddy currents in an iron circuit of the solenoid valve and in the capsule, and
    wherein the eddy currents are operable to heat up the fluid in the valve cartridge.

2. The solenoid valve as claimed in claim 1, wherein the iron circuit of the solenoid valve includes the armature, the housing, and the cover disc.

3. The solenoid valve as claimed in claim 1, wherein a heating operation of the magnet assembly includes at least two heating modes that each have a predetermined frequency range for the bipolar AC signals.

4. The solenoid valve as claimed in claim 3, wherein, in a first heating mode, the predetermined frequency of the bipolar AC signal is predetermined from a first frequency range so that the valve does not react to the applied control signals.

5. The solenoid valve as claimed in claim 4, wherein the first frequency range includes frequencies in the range of ca. 0.1 kHz to 2.0 kHz.

6. The solenoid valve as claimed in claim 3, wherein, in a second heating mode, the predetermined frequency of the bipolar AC signal is configured to be predetermined from a second frequency range so as to achieve a maximal inductive thermal output.

7. The solenoid valve as claimed in claim 6, wherein the second frequency range includes frequencies in the range of ca. 2.1 kHz to 3.0 kHz.

8. The solenoid valve as claimed in claim 3, wherein, in a third heating mode, the heating mode is switched between the first heating mode and the second heating mode based on an operating state of the vehicle, and
    wherein a prevailing frequency of the bipolar AC signal is dependent upon an available onboard network voltage.

9. The solenoid valve as claimed in claim 8, wherein an optimal frequency for each voltage position is stored in the form of a characteristic curve.

10. A solenoid valve for a vehicle braking system, comprising:
- a magnet assembly including:
  - a winding support;
  - a coil winding;
  - a housing; and
  - a cover disc;
- a valve cartridge including:
  - a capsule;
  - a valve insert connected to the capsule;
  - a valve seat; and
  - an armature configured to be guided within the capsule in an axially movable manner between a closed position and an open position, the armature including a closing element,
- wherein the closing element and the valve seat are configured to form a valve that is operable to control a fluid flow through the valve cartridge,
- wherein the coil winding is wound on the winding support to form an electrical coil, the electrical coil being configured to be controlled by using control signals applied to electrical connectors,
- wherein the electric coil is further configured to generate a magnetic force that is operable to move the armature against a force of a return spring,
- wherein fluid temperature within the valve cartridge is changeable based on the control signals,
- wherein the control signals are configured to be applied to the coil winding as bipolar AC signals having a pre-determined frequency and are further configured to generate eddy currents in an iron circuit of the solenoid valve and in the capsule,
- wherein the eddy currents are operable to heat up the fluid in the valve cartridge, and
- wherein the coil winding is configured to be arranged in a bridge branch of an H-bridge circuit, the H-bridge circuit including four switching transistors.

* * * * *